(12) United States Patent
Sokolov et al.

(10) Patent No.: US 7,036,120 B2
(45) Date of Patent: *Apr. 25, 2006

(54) TWO TIER CLUSTERS FOR REPRESENTATION OF OBJECTS IN JAVA PROGRAMMING ENVIRONMENTS

(75) Inventors: Stepan Sokolov, Fremont, CA (US); David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 546 days.

This patent is subject to a terminal disclaimer.

(21) Appl. No.: 09/919,743

(22) Filed: Jul. 31, 2001

(65) Prior Publication Data

US 2003/0028865 A1 Feb. 6, 2003

(51) Int. Cl.
*G06F 9/44* (2006.01)

(52) U.S. Cl. .......................... 717/166; 717/127
(58) Field of Classification Search ................ 717/149, 717/136, 127, 114–118, 148, 153, 162–167; 719/316, 330; 707/206
See application file for complete search history.

(56) References Cited

U.S. PATENT DOCUMENTS

| | | | | |
|---|---|---|---|---|
| 5,920,720 | A | * 7/1999 | Toutonghi et al. | 717/148 |
| 6,070,173 | A |   5/2000 | Huber et al. | 717/206 |
| 6,088,777 | A | * 7/2000 | Sorber | 711/171 |
| 6,115,719 | A | * 9/2000 | Purdy et al. | 707/103 R |
| 6,134,603 | A | * 10/2000 | Jones et al. | 719/330 |
| 6,151,703 | A | * 11/2000 | Crelier | 717/136 |
| 6,154,747 | A | * 11/2000 | Hunt | 707/100 |
| 6,237,043 | B1 | * 5/2001 | Brown et al. | 719/316 |

(Continued)

FOREIGN PATENT DOCUMENTS

| | | |
|---|---|---|
| WO | WO 00/41079 | 7/2000 |
| WO | WO 00/46667 | 8/2000 |
| WO | WO 00/60470 | 10/2000 |

OTHER PUBLICATIONS

Printezis et al. A Generational Mostly–concurrent Garbage Collector. ACM. 2000. pp. 143–154.*
McDowell. Reducing garbage in Java. ACM. pp. 84–86. 1998.*
Radhakrishnan et al., Architectural issues in Java runtime systems, Jan. 2000, IEEE, p. 387–398.*
Yuxin et al., "A Precise Incremental Garbage Collection Algorithm for Java Virtual Machine," International Conference for Young Computer Scientists, ICYCS. Proceedings of ICYCS, vol. 1, Aug. 17, 1999, pp. 227–231.
Per Bothner, "A Gcc–based Java Implementation," 1997, IEEE, pp. 174–178.
"Java™ 2 Platform, Standard Edition, v1.2.2 API Specification," May 8, 1999, Sun Microsystems, Inc.

(Continued)

*Primary Examiner*—Wei Y. Zhen
(74) *Attorney, Agent, or Firm*—Beyer Weaver & Thomas, LLP

(57) ABSTRACT

Improved techniques for representation of objects in a Java™ programming environment are disclosed. The techniques are highly suitable for representation of Java™ objects inside virtual machines, especially those that operate with limited resources (e.g., embedded systems). A cluster of Java™ object representations is disclosed. Each of the Java™ object representations provide a reference to a Java™ object and a reference to the class associated with the Java™ object. Accordingly, a two-tier representation is provided which allows efficient implementation of applications which need to access information regarding both Java™ objects and classes. As a result, quick access to information regarding Java™ objects can be achieved.

16 Claims, 5 Drawing Sheets

U.S. PATENT DOCUMENTS

| | | |
|---|---|---|
| 6,249,906 B1 | 6/2001 | Levine et al. ................ 717/113 |
| 6,282,702 B1 | 8/2001 | Ungar ........................ 717/148 |
| 6,330,709 B1 * | 12/2001 | Johnson et al. ............. 717/100 |
| 6,470,494 B1 * | 10/2002 | Chan et al. ................. 717/166 |
| 6,470,893 B1 | 10/2002 | Boesen ....................... 717/130 |
| 6,530,080 B1 * | 3/2003 | Fresko et al. ............... 717/166 |
| 6,704,746 B1 * | 3/2004 | Sokolov et al. ......... 707/103 R |
| 6,711,576 B1 * | 3/2004 | Tuck et al. ................. 707/100 |
| 6,711,657 B1 * | 3/2004 | Sexton et al. ............... 711/170 |
| 6,728,955 B1 | 4/2004 | Berry et al. ................. 717/159 |
| 6,732,357 B1 | 5/2004 | Berry et al. ................. 717/158 |
| 6,832,509 B1 | 12/2004 | Morinaga et al. ........ 713/118.1 |
| 6,851,111 B1 | 2/2005 | McGuire et al. ............ 717/166 |
| 2004/0015911 A1 | 1/2004 | Hinsley et al. ............. 717/147 |
| 2004/0015914 A1 | 1/2004 | Renouf ....................... 717/148 |

OTHER PUBLICATIONS

Office Action dated May 20, 2004 from U.S. Appl. No. 09/886,454.

Lindholm et al, "The Java™ Virtual Machine Specification", (Sep., 1996), Sun Microsystems, Inc., Chapters 1–10 (173 pp.).

* cited by examiner

TWO TIER CLUSTERS FOR REPRESENTATION OF OBJECTS IN JAVA PROGRAMMING ENVIRONMENTS

CROSS REFERENCE TO RELATED APPLICATIONS

This application is related to U.S. patent application Ser. No. 09/886,454 entitled "REPRESENTATION OF OBJECTS IN A JAVA™ PROGRAMMING ENVIRONMENT" filed on Jun. 20, 2001 and is hereby incorporated by reference in its entirety herein.

BACKGROUND OF THE INVENTION

The present invention relates generally to Java™ programming environments, and more particularly, to techniques suitable for representation of objects in a Java™ programming environment.

One of the goals of high level languages is to provide a portable programming environment such that the computer programs may easily be ported to another computer platform. High level languages such as "C" provide a level of abstraction from the underlying computer architecture and their success is well evidenced from the fact that most computer applications are now written in a high level language.

Portability has been taken to new heights with the advent of the World Wide Web ("the Web") which is an interface protocol for the Internet that allows communication between diverse computer platforms through a graphical interface. Computers communicating over the Web are able to download and execute small applications called applets. Given that applets may be executed on a diverse assortment of computer platforms, the applets are typically executed by a Java™ virtual machine.

Recently, the Java™ programming environment has become quite popular. The Java™ programming language is a language that is designed to be portable enough to be executed on a wide range of computers ranging from small devices (e.g., pagers, cell phones and smart cards) up to supercomputers. Computer programs written in the Java™ programming language (and other languages) may be compiled into Java™ Bytecode instructions that are suitable for execution by a Java™ virtual machine implementation. The Java™ virtual machine is commonly implemented in software by means of an interpreter for the Java™ virtual machine instruction set but, in general, may be software, hardware, or both. A particular Java™ virtual machine implementation and corresponding support libraries together constitute a Java™ runtime environment.

Computer programs in the Java™ programming language are arranged in one or more classes or interfaces (referred to herein jointly as classes or class files). Such programs are generally platform, i.e., hardware and operating system, independent. As such, these computer programs may be executed without modification on any computer that is able to run an implementation of the Java™ runtime environment.

Object-oriented classes written in the Java™ programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java™ virtual machine) is described in some detail in *The Java™ Virtual Machine Specification, Second Edition*, by Tim Lindholm and Frank Yellin, which is hereby incorporated herein by reference.

FIG. 1A shows a progression of a simple piece of a Java™ source code 101 through execution by an interpreter, the Java™ virtual machine. The Java™ source code 101 includes the classic Hello World program written in Java™. The source code is then input into a Bytecode compiler 103 that compiles the source code into Bytecodes. The Bytecodes are virtual machine instructions as they will be executed by a software emulated computer. Typically, virtual machine instructions are generic (i.e., not designed for any specific microprocessor or computer architecture) but this is not required. The Bytecode compiler outputs a Java™ class file 105 that includes the Bytecodes for the Java™ program. The Java™ class file is input into a Java™ virtual machine 107. The Java™ virtual machine is an interpreter that decodes and executes the Bytecodes in the Java™ class file. The Java™ virtual machine is an interpreter, but is commonly referred to as a virtual machine as it emulates a microprocessor or computer architecture in software (e.g., the microprocessor or computer architecture may not exist in hardware).

FIG. 1B illustrates a simplified class file 100. As shown in FIG. 1B, the class file 100 includes a constant pool 102 portion, interfaces portion 104, fields portion 106, methods portion 108, and attributes portion 110. The attributes (or attributes table) 110 portion represents the attributes associated with the class file 100. This allows for one or more attributes to be defined, each of which can be associated with one or more components of the class file. As is known to those skilled in the art, the Java™ virtual machine implementations are allowed to define and use various attributes. In addition, the virtual machine's implementations ignore attributes that they do not recognize. Thus, a class file may contain one or more attributes, all or none of which may be recognized by a particular virtual machine implementation.

Conventionally, Java™ objects are represented in memory so that the methods associated with the objects can be referenced from the object representation. Typically, there is a reference from the Java™ object representation directly to a method table that includes the methods associated with the object. Direct reference to the method table allows efficient invocation of the Java™ method. However, conventional implementations typically require a significant amount of processing in order to access the information relating to Java™ object (e.g., object type, object size, static fields). The information about the Java™ object is stored in an internal class representation of the object. In other words, the virtual machine typically internally represents the information associated with the Java™ object in an internal class representation. Unfortunately, accessing this information takes up valuable processing time. This can seriously hinder performance of virtual machines, especially in systems with limited computing power and/or memory (e.g., embedded systems).

Furthermore, using conventional Java™ object representations, it is difficult to implement a single "garbage collection" scheme that allows removal of Java™ objects, as well as Java™ classes. In other words, conventionally, one garbage collection method is used to remove Java™ objects when they are no longer needed, and another garbage collection method is used to remove classes from memory when they are no longer needed. Thus, garbage collection can use a significant amount of memory and computing time of a conventional virtual machine. As a result, the performance of virtual machines, especially those operating with relatively smaller resources, can be, adversely affected.

In view of the foregoing, improved techniques for representation of objects in Java™ programming environments are needed.

SUMMARY OF THE INVENTION

Broadly speaking, the present invention relates to techniques for representation of objects in Java™ programming environments. The techniques are highly suitable for representation of Java™ objects inside virtual machines, especially those that operate with limited resources (e.g., embedded systems). In accordance with one aspect of the invention, a cluster which includes a plurality of Java™ object representations is disclosed. As will be appreciated, each of the Java™ object representations in the cluster provide a reference to a Java™ object and a reference to the class associated with the Java™ object. Accordingly, a two-tier representation can be provided which allows efficient implementation of applications which need to access information regarding both Java™ objects and classes. Thus, the invention can be used to reduce the processing required to perform applications, such as garbage collection, that can take up a significant amount of resources. As a result, performance of the virtual machines, especially those operating with relatively limited resources, can be improved.

Furthermore, one of the references in the two-tier representation can provide direct access to the internal class representation associated with the object. The internal class representation provides information regarding the Java™ object (e.g., object size, object type, static fields, etc.). As a result, the invention allows quick access to information regarding Java™ objects. This means that the processing time needed to access information regarding Java™ objects is reduced. Thus, the invention can enhance the performance of virtual machines, especially in systems with limited computing power and/or memory.

The invention can be implemented in numerous ways, including as a method, an apparatus, a computer readable medium, and a database system. Several embodiments of the invention are discussed below.

As a virtual machine, one embodiment of the invention includes a first portion of memory including a plurality of Java™ object representations, wherein each of the Java™ object representations consists of a first reference to an internal class representation of a class associated with a Java™ object, and a second reference to instance fields associated with the Java™ object.

As a method for identifying active Java™ objects and active Java™ classes, one embodiment of the invention includes the acts of: reading a cluster of Java™ object representations arranged sequentially, determining whether Java™ objects are to be identified, marking in memory addresses that correspond to Java™ objects when it is determined that Java™ objects are to be identified, and marking in memory addresses that correspond to Java™ classes when it is determined that Java™ classes are to be identified.

As a computer readable medium including computer program code for identifying active Java™ objects and active Java™ classes, one embodiment of the invention includes: computer program code for reading a cluster of Java™ object representations arranged sequentially, computer program code for determining whether Java™ objects are to be identified, computer program code for marking in memory address that correspond to Java™ objects when it is determined that Java™ object are to be identified; and computer program code for marking in memory address that correspond to Java™ classes when it is determined that Java™ classes are to be identified.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As noted in the background section, the Java™ programming environment has enjoyed widespread success. Therefore, there are continuing efforts to extend the breadth of Java™ compatible devices and to improve the performance of such devices. One of the most significant factors influencing the performance of Java™ based programs on a particular platform is the performance of the underlying virtual machine.

Typically the virtual machines internally represent and store the information associated with the Java™ object's class. However, accessing this information using conventional techniques takes up valuable processing time. This can seriously hinder performance of virtual machines, especially in systems with limited computing power and/or memory. Accordingly, there have been extensive efforts by a number of entities to improve performance in Java™ compliant virtual machines.

The present invention pertains to techniques for representation of objects in Java™ programming environments. The techniques are highly suitable for representation of Java™ objects inside virtual machines, especially those that operate with limited resources (e.g., embedded systems). In accordance with one aspect of the invention, a cluster which includes a plurality of Java™ object representations is disclosed. As will be appreciated, each of the Java™ object representations in the cluster provide a reference to a Java™ object and a reference to the class associated with the Java™ object. Accordingly, a two-tier representation can be provided which allows efficient implementation of applications which need to access information regarding both Java™ objects and classes. Thus, the invention can be used to reduce the processing required to perform applications, such as garbage collection, that can take up a significant amount of resources. As a result, the performance of the virtual machines, especially those operating with relatively small resources, can be improved.

Furthermore, one of the references in the two-tier representation can provide direct access to the internal class representation associated with the object. The internal class representation provides information regarding the Java™ object (e.g., object size, object type, static fields, etc.). As a result, the invention allows quick access to information regarding Java™ objects. This means that the processing time needed to access information regarding Java™ objects is reduced. Thus, the invention can enhance performance of virtual machines, especially in systems with limited computing power and/or memory. Embodiments of the invention are discussed below with reference to FIGS. 2–4. However, those skilled in the art will readily appreciate that the detailed description given herein with respect to these figures is for explanatory purposes only as the invention extends beyond these limited embodiments.

Figure 1A:
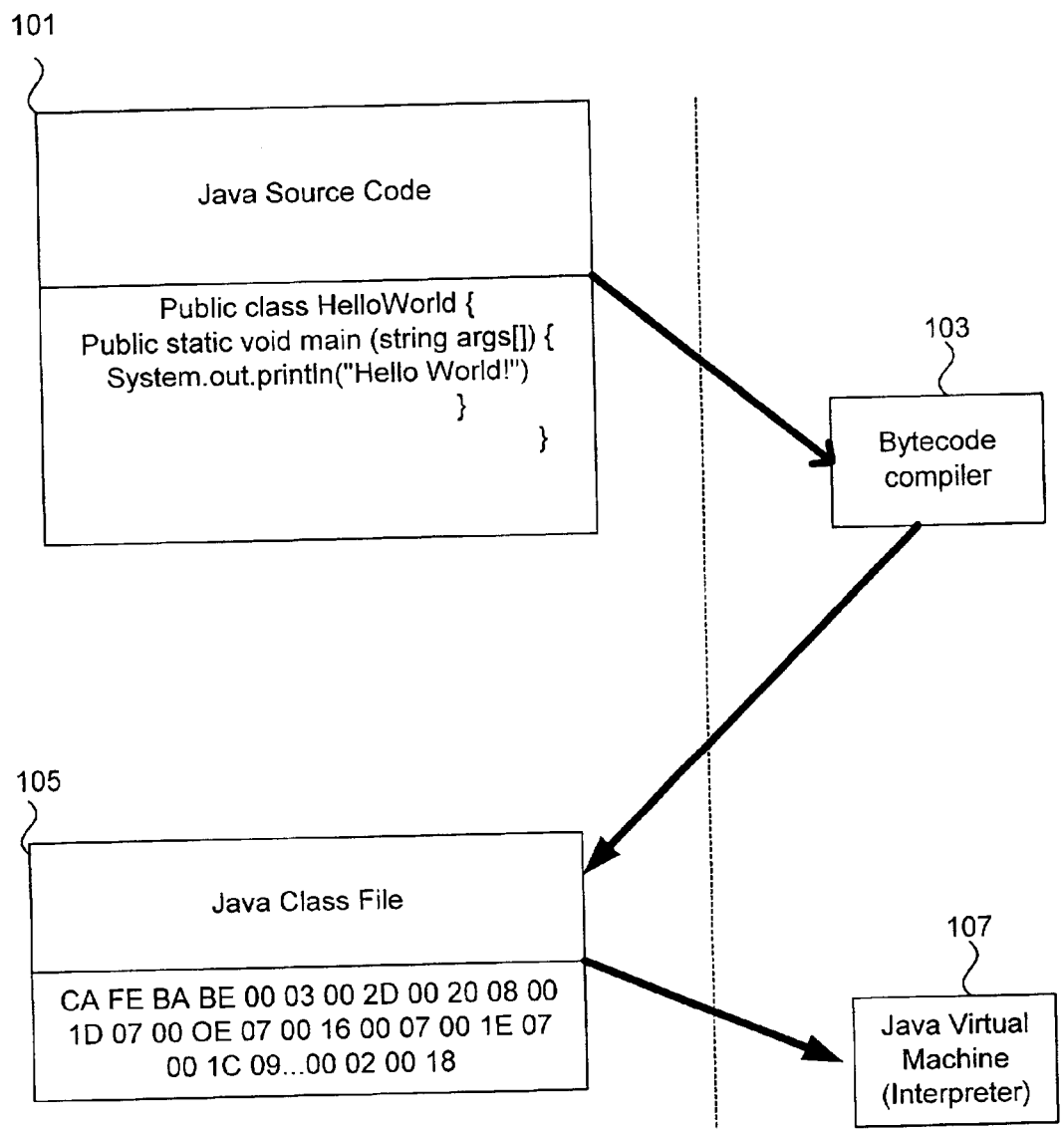
FIG. 1A shows a progression of a simple piece of a Java™ source code through execution by an interpreter, the Java™ virtual machine.
Figure 1B:
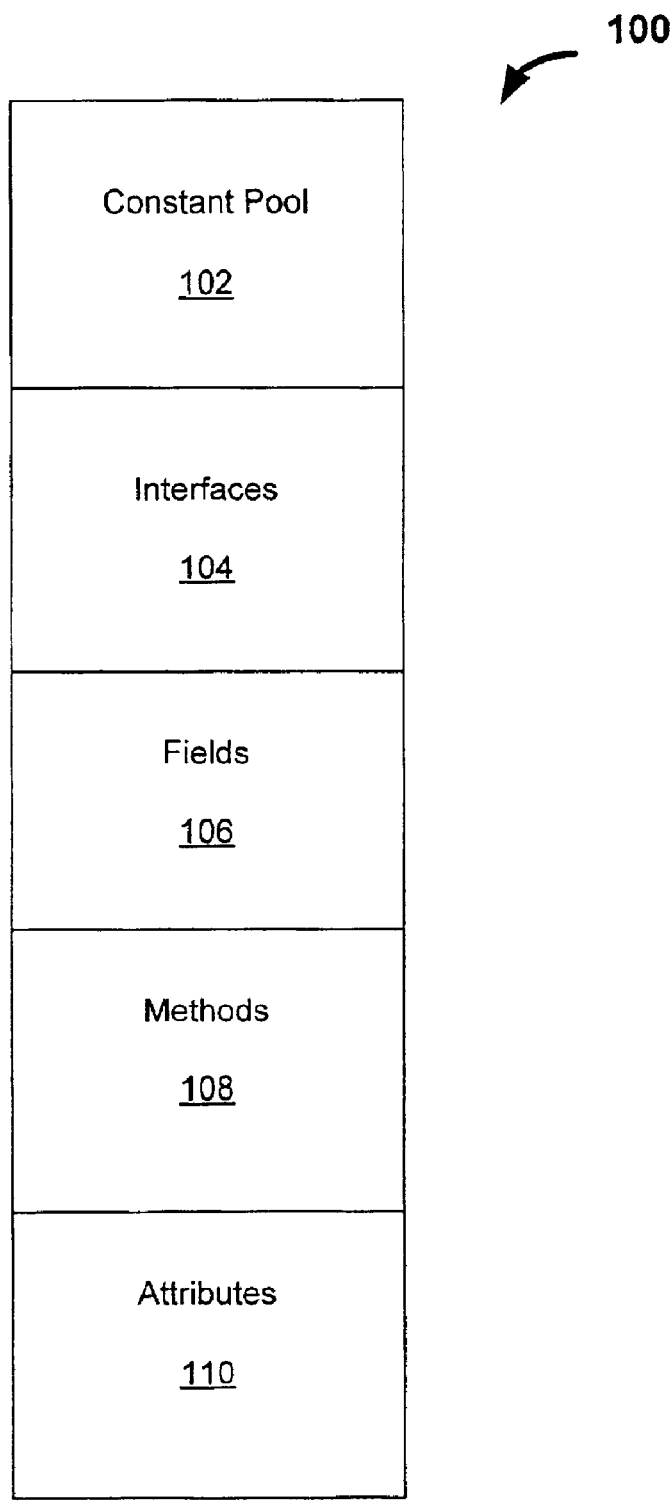
FIG. 1B illustrates a simplified class file.
Figure 2:
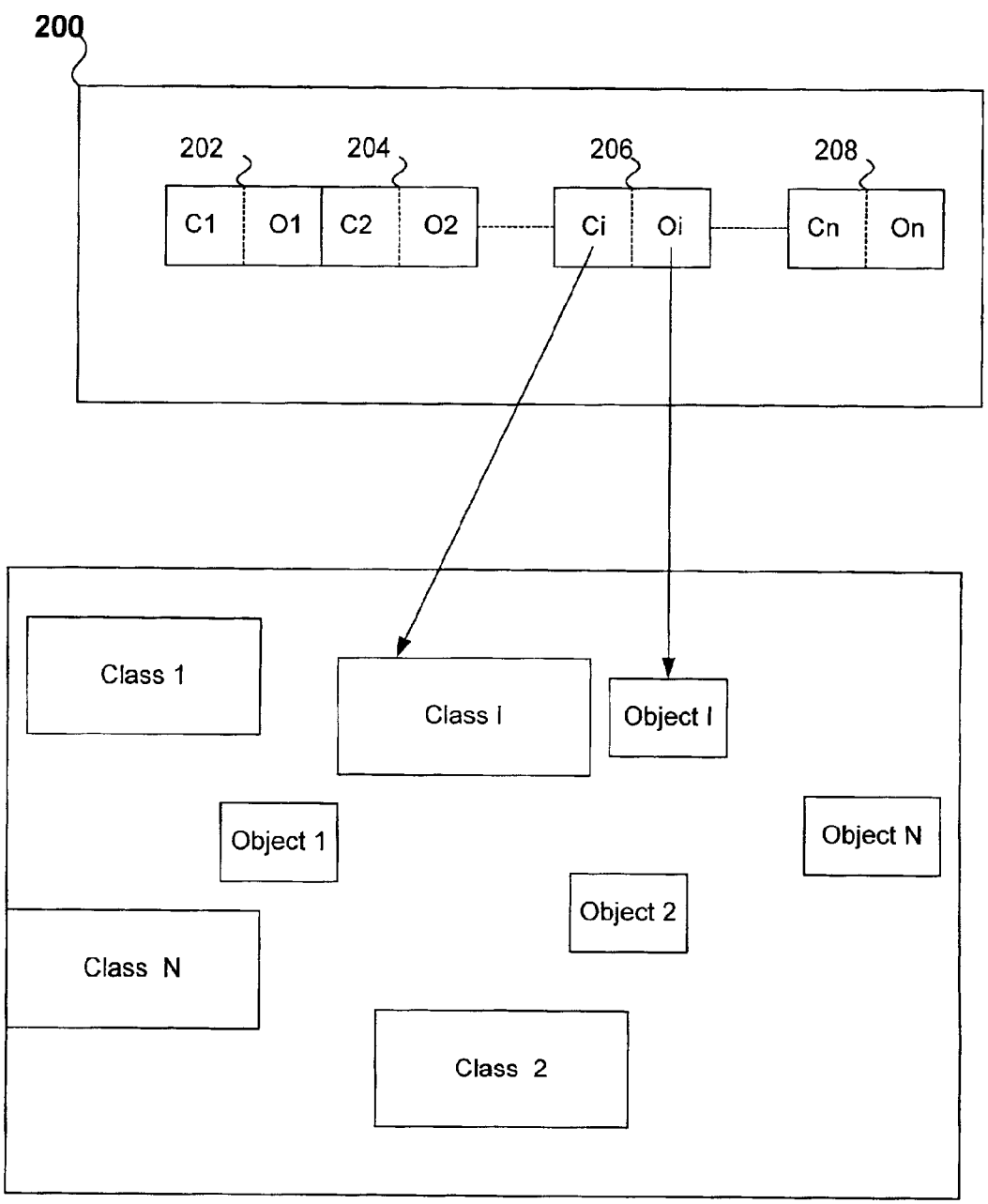
FIG. 2 represents a Java™ computing environment including a cluster of Java™ object representations in accordance with one embodiment of the invention.

FIG. 2 represents a Java™ computing environment including a cluster 200 in accordance with one embodiment of the invention. The cluster 200 is suitable for implementation in a memory portion of a Java™ virtual machine. As shown in FIG. 2, the cluster 200 includes a plurality of two-tier object representations 202, 204, 206 and 208, wherein each of the object representations consist of a first portion and a second portion. The first portions $C_1$, $C_2$, $C_i$ and $C_n$ represent references to Java™ classes. The second portions $O_1$, $O_2$, $O_i$ and $O_n$ represent references to Java™ objects. Accordingly, each of the two-tier object representations 202, 204, 206 and 208 provide references to a Java™ class and an object associated with that class. For example, the two-tier object representation 206 provides the reference $C_1$ to a class I and reference $O_i$ to the object I of class I. As will be appreciated by those skilled in the art, the arrangement of the cluster 200 allows for efficient access partly because the first and second portions can be of the same size (e.g., 4 bytes).

Figure 3:
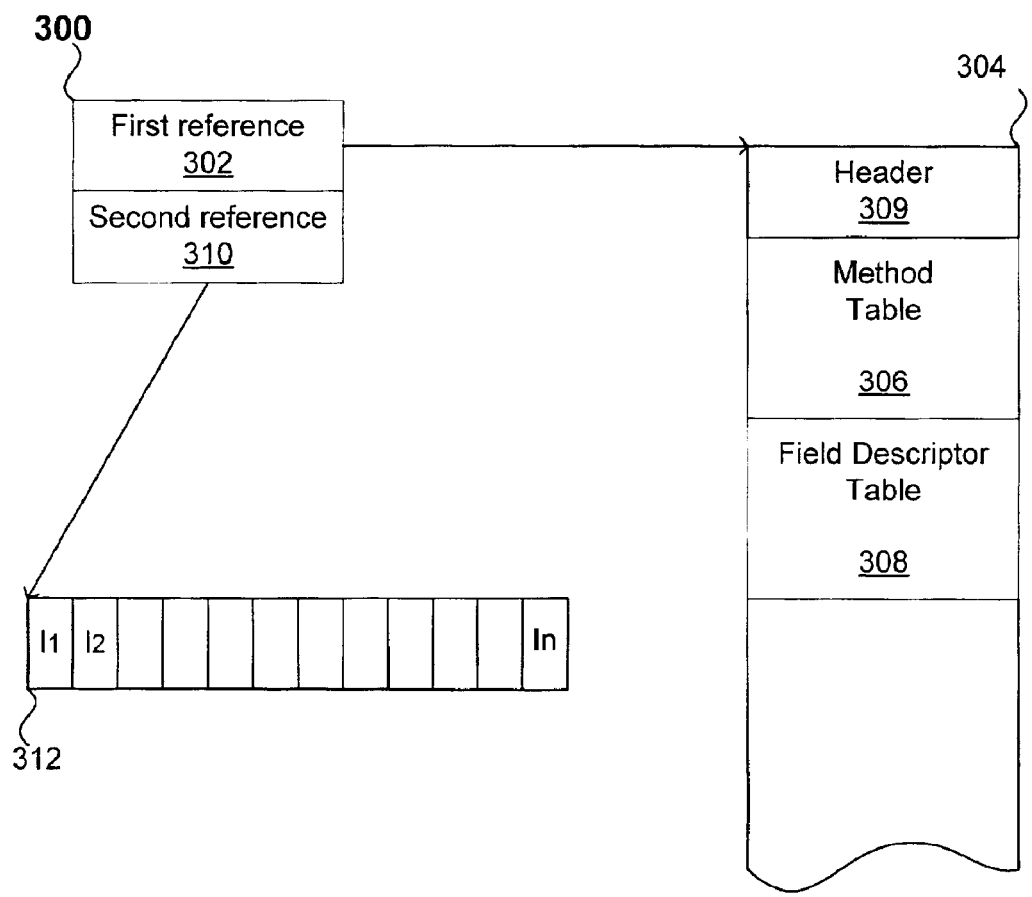
FIG. 3 illustrates a Java™ object representation in accordance with one embodiment of the invention.

The reference to a class can be a reference to an internal class representation of the class. FIG. 3 illustrates a Java™ object representation 300 in accordance with one embodiment of the invention. The Java™ object representation 300 illustrates in greater detail the two-tier object representations 202, 204, 206 and 208 of FIG. 2. As shown in FIG. 3, the object representation 300 includes a first reference 302 to an internal class representation 304. The internal class representation 304 provides information regarding the Java™ object. This information can include, for example, a method table 306 and a field descriptor table 308, as well as other information relating to the Java™ object. In the described embodiment, the method table 310 immediately follows a header 309 which is of a predetermined size.

As will be appreciated, the first reference 302 can be used to directly access the internal class representation 304 so that information regarding the Java™ object can be accessed quickly. As a result, information regarding objects can be accessed more quickly than conventional techniques which require more processing to find this information.

In addition, the object representation 300 includes a second reference 310 to instance fields associated with the Java™ object. These instance fields can be unique for each object and can, for example, include instance variables $I_1$–$I_n$. Instance fields in the context of the Java™ programming language are well known to those skilled in the art.

It should be noted that the internal object representation 300 may include an identifier that uniquely identifies the Java™ object. As will be appreciated by those skilled in the art, the identifier can be a hash key. In one embodiment, the address of the first reference 302 is used as the hash key. It should also be noted that the first and second references 302 and 310 represent two consecutive memory addresses. As such, each of the first and second references 302 and 310 can be four consecutive bytes (one word) in a memory portion of the virtual machine.

Figure 4:
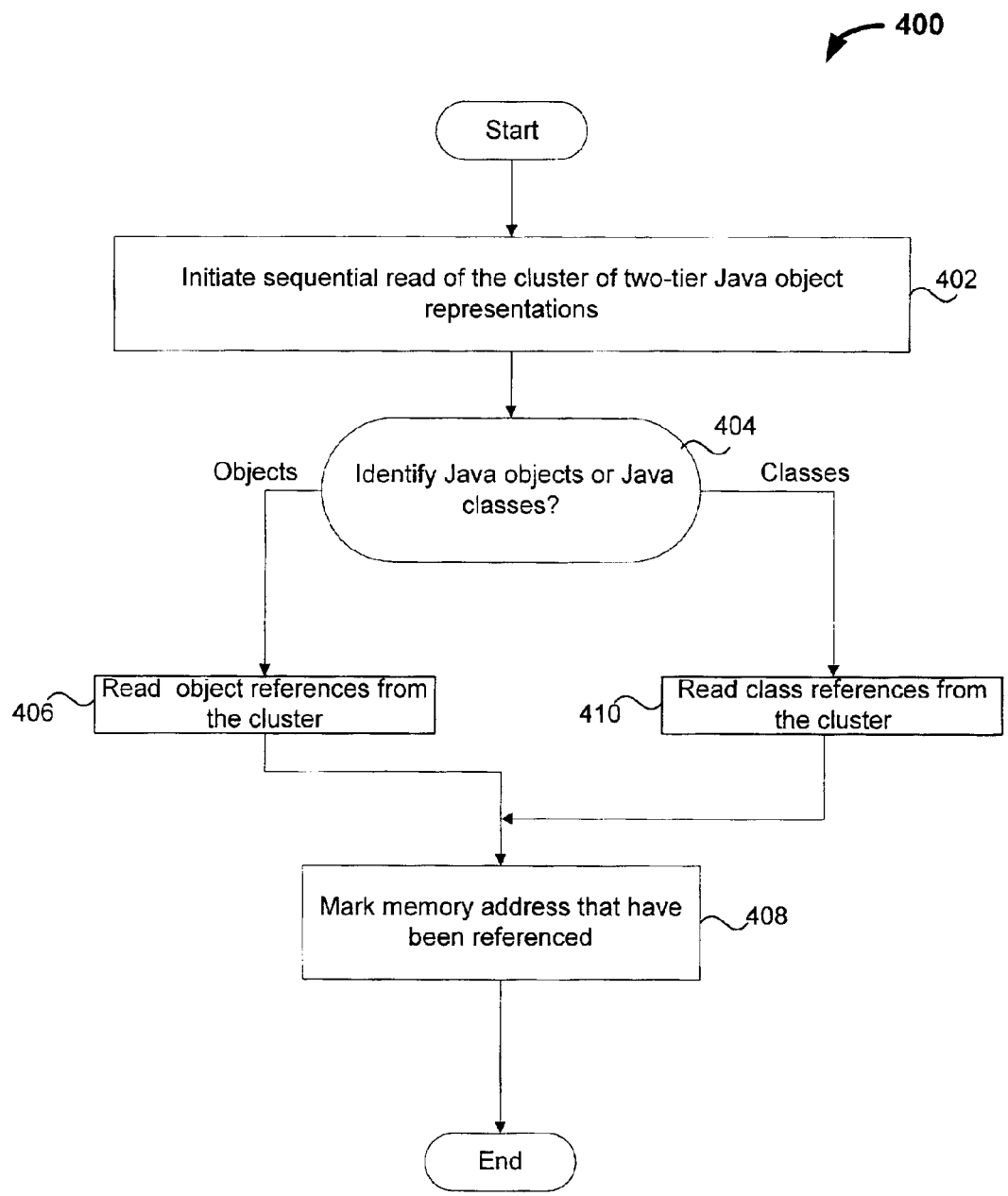
FIG. 4 illustrates a method for identifying active Java™ objects and classes in accordance with one embodiment of the invention.

FIG. 4 illustrates a method 400 for identifying active Java™ objects and classes in accordance with one embodiment of the invention. As such, the method 400 can be used in a virtual machine to perform garbage collection. Moreover, the method 400 can be used to perform garbage collection for both Java™ classes and objects. Accordingly, the method 400 can be used to implement efficient garbage collection applications.

Initially, at operation 402, a sequential read of a cluster of two-tier Java™ object representations is initiated. Next, at operation 404, a determination is made as to whether Java™ objects or Java™ classes are to be identified. If it is determined at operation 404 that Java™ objects are to be identified, the method 400 proceeds to operation 406 where references to Java™ objects are sequentially read from the cluster of two-tier Java™ object representations. Thereafter, at operation 408, the memory addresses that have been read are marked. The method 400 ends following operation 408. However, if it is determined at operation 404 that Java™ objects are to be identified, the method 400 proceeds to operation 410 where references to Java™ classes are sequentially read from the cluster of two-tier Java™ object representations. Thereafter, at operation 408, the memory addresses that have been read are marked. The method 400 ends following operation 408.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. In a Java™ computing environment, a method of identifying active Java™ objects and active Java™ classes by a virtual machine at runtime during garbage collection, said method comprising:

generating and loading in the virtual machine prior to execution time a cluster of Java™ object representations which are sequentially represented inside the virtual machine, wherein each of said Java™ object representations in said cluster consists of:
a first reference to an internal class representation of a class associated with a Java™ object, and
a second reference to instance fields associated with said Java™ object;

sequentially reading by said virtual machine at runtime said cluster of Java™ object representations;

determining by said virtual machine at runtime during garbage collection whether Java™ objects or Java™ classes are to be identified;

using said second references of said cluster during garbage collection to mark memory addresses that correspond to Java™ objects when said determining determines that Java™ objects are to be identified, thereby allowing Java™ objects to be identified at runtime by a sequential read of said cluster; and using one or more of said first references of said cluster during garbage collection to mark memory addresses that correspond to Java™ classes when said determining determines that Java™ classes are to be identified, thereby allowing Java™ classes to be identified at runtime during garbage collection by a sequential read of said cluster, wherein said first reference is a direct reference to said internal class representation of said Java™ object.

2. A method as recited in claim 1, wherein said second reference is a reference to an array of references, and wherein each reference in said array of references is a reference to an instance field associated with said Java™ object.

3. A method as recited in claim 1, wherein said first and second references are allocated as four bytes.

4. A method as recited in claim 1, wherein said method further comprises:

removing internal class representations that have not been marked.

5. A method as recited in claim 1, wherein said method further comprises:

removing Java™ objects that have not been marked.

6. A computer readable medium including at least computer program code for identifying active Java™ objects and active Java™ classes by a virtual machine at runtime during garbage collection, comprising:

computer program code for generating and loading in the virtual machine prior to execution time a cluster of Java™ object representations which are sequentially represented inside the virtual machine, wherein each of said Java™ object representations in said cluster consists of:

a first reference to an internal class representation of a class associated with a Java™ object, and a second reference to instance fields associated with said Java™ object;

computer program code for sequentially reading by said virtual machine at runtime during garbage collection said cluster of Java™ object representations;

computer program code for determining by said virtual machine at runtime during garbage collection whether Java™ objects or Java™ classes are to be identified;

computer program code for using said second references of said cluster during garbage collection to mark memory addresses that correspond to Java™ objects when said determining determines that Java™ objects are to be identified, thereby allowing Java™ objects to be identified at runtime by a sequential read of said cluster; and computer program code for using one or more of said first references of said cluster during garbage collection to mark memory addresses that correspond to Java™ classes when said determining determines that Java™ classes are to be identified, thereby allowing Java™ classes to be identified at runtime during garbage collection by a sequential read of said cluster, wherein said first reference is a direct reference to said internal class representation of said Java™ object.

7. A computer readable medium as recited in claim 6, wherein said second reference is a reference to an array of references, and wherein each reference in said array of references is a reference to an instance field associated with said Java™ object.

8. A computer readable medium as recited in claim 7, wherein said first and second references are allocated as four bytes.

9. A computer-readable medium as recited in claim 6, further comprising:

computer program code for removing internal class representations that have not been marked.

10. A computer-readable medium as recited in claim 6, further comprising:

computer program code for removing Java™ objects that have not been marked.

11. A computer-readable medium as recited in claim 6, wherein said Java™ objects are identified for garbage collection at runtime.

12. In a Java™ computing environment, a computer system for identifying active Java™ objects and active Java™ classes by a virtual machine at runtime during garbage collection, said computer system comprising:

memory;

at least one processor which is configured to:

generate and load in the virtual machine prior to execution time a cluster of Java™ object representations which are sequentially represented inside the virtual machine, wherein each of said Java™ object representations in said cluster consists of: a first reference to an internal class representation of a class associated with a Java™ object, and a second reference to instance fields associated with said Java™ object;

sequentially reading by said virtual machine at runtime said cluster of Java™ object representations:

determine by said virtual machine at runtime during garbage collection whether Java™ objects or Java™ classes are to be identified;

use said second references of said cluster during garbage collection to mark memory addresses that correspond to Java™ objects when said determining determines that Java™ objects are to be identified, thereby allowing Java™ objects to be identified at runtime by a sequential read of said cluster; and use one or more of said first references of said cluster during garbage collection to mark memory addresses that correspond to Java™ classes when said determining determines that Java™ classes are to be identified, thereby allowing Java™ classes to be identified at runtime during garbage collection by a sequential read of said cluster, wherein said first reference is a direct reference to said internal class representation of said Java™ object.

13. A computer system as recited in claim 12, wherein said second reference is a reference to an array of references, and wherein each reference in said array of references is a reference to an instance field associated with said Java™ object.

14. A computer system as recited in claim 12, wherein said first and second references are allocated as four bytes.

15. A computer system as recited in claim 12, wherein said at least one processor is further configured to remove internal class representations that have not been marked.

16. A computer system as recited in claim 12, wherein said at least one processor is further configured to remove Java™ objects that have not been marked.

* * * * *